(12) United States Patent
Jiao et al.

(10) Patent No.: US 11,558,748 B2
(45) Date of Patent: Jan. 17, 2023

(54) ANTI-THEFT MOBILE TERMINAL AND METHOD FOR CONTROLLING THE EXTRACTION OF A MEMORY CARD OUT FROM A MOBILE TERMINAL

(71) Applicant: Orange, Issy-les-Moulineaux (FR)

(72) Inventors: Shi Jiao, Beijing (CN); Zhihong Guo, Beijing (CN)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 16/772,494

(22) PCT Filed: Dec. 14, 2018

(86) PCT No.: PCT/IB2018/001550
§ 371 (c)(1),
(2) Date: Jun. 12, 2020

(87) PCT Pub. No.: WO2019/116098
PCT Pub. Date: Jun. 20, 2019

(65) Prior Publication Data
US 2020/0404506 A1 Dec. 24, 2020

(30) Foreign Application Priority Data
Dec. 15, 2017 (CN) .................. PCT/CN2017/116380

(51) Int. Cl.
*G06F 21/88* (2013.01)
*H04M 1/725* (2021.01)
(Continued)

(52) U.S. Cl.
CPC .......... *H04W 12/126* (2021.01); *G06F 21/32* (2013.01); *G06F 21/88* (2013.01); *H04W 12/06* (2013.01); *G06F 2221/2149* (2013.01)

(58) Field of Classification Search
CPC ..... H04W 12/126; H04W 12/06; G06F 21/32; G06F 21/88; G06F 2221/2149; G06F 21/31; G06F 21/79; G06K 13/085
See application file for complete search history.

(56) References Cited

U.S. PATENT DOCUMENTS

| | | | |
|---|---|---|---|
| 2009/0143048 A1 | 6/2009 | Ayanamcottil et al. | |
| 2011/0034211 A1* | 2/2011 | Li | H04W 8/183 455/558 |
| 2016/0364564 A1* | 12/2016 | Lee | G06F 3/0482 |

FOREIGN PATENT DOCUMENTS

| CN | 1529490 A | 9/2004 |
|---|---|---|
| CN | 101330681 A | 6/2008 |

(Continued)

OTHER PUBLICATIONS

Jiska Classen, Alexander Heinrich, Robert Reith, Matthias Hollick; "Evil Never Sleeps: When Wireless Malware Stays on after Turning Off iPhones"; WiSec '22: Proceedings of the 15th ACM Conference on Security and Privacy in Wireless and Mobile Networks; May 2022; pp. 146-156 (Year: 2022).*

(Continued)

*Primary Examiner* — Shewaye Gelagay
*Assistant Examiner* — Courtney D Fields
(74) *Attorney, Agent, or Firm* — Knobbe, Martens, Olson & Bear LLP

(57) ABSTRACT

The disclosed technology relates to a mobile terminal adapted to receive a memory card comprising a processing unit, an input interface and a card locking actuator configured to lock the memory card into the mobile terminal. The card locking actuator is controlled by the processing unit. In one aspect, the card locking actuator is configured to be locked when the mobile terminal is switched on. In another aspect, the processing unit is configured to lock the screen until a screen unlocking authentication procedure is per- (Continued)

formed by a user at the input interface and is configured to command unlocking of the card locking actuator after detecting that a predetermined authentication procedure is performed by a user at the input interface.

16 Claims, 2 Drawing Sheets

(51) Int. Cl.
  *H04W 12/126* (2021.01)
  *G06F 21/32* (2013.01)
  *H04W 12/06* (2021.01)

(56) References Cited

FOREIGN PATENT DOCUMENTS

| | | | |
|---|---|---|---|
| CN | 102739868 A | 10/2012 | |
| CN | 104853013 A | 8/2015 | |
| CN | 105530356 A | 4/2016 | |
| CN | 106488434 A | 3/2017 | |
| DE | 10 2014 013124 A1 | 3/2016 | |
| EP | 2 993 869 A1 | 3/2016 | |
| EP | 2993869 A1 * | 3/2016 | ........... G06F 1/1658 |
| GB | 2 398 706 A | 8/2004 | |
| WO | WO-2018207123 A1 * | 11/2018 | ............. G06F 21/88 |

OTHER PUBLICATIONS

Notification of Transmittal of the International Search Report and The Written Opinion of the International Searching Authority, or the Declaration for International Application No. PCT/CN2017/116380 dated Sep. 13, 2018.

International Search Report dated Mar. 12, 2019 for Application No. PCT/IB2018/001550.

* cited by examiner

ANTI-THEFT MOBILE TERMINAL AND METHOD FOR CONTROLLING THE EXTRACTION OF A MEMORY CARD OUT FROM A MOBILE TERMINAL

RELATED APPLICATIONS

This application is filed under 35 U.S.C. § 371 as the U.S. National Phase of Application No. PCT/IB2018/001550 entitled "ANTI-THEFT MOBILE TERMINAL AND METHOD FOR CONTROLLING THE EXTRACTION OF A MEMORY CARD OUT FROM A MOBILE TERMINAL" and filed Dec. 14, 2018, which claims the benefit of Application No. PCT/CN2017/116380, filed Dec. 15, 2017, each of which is incorporated by reference in its entirety.

FIELD OF THE INVENTION

The present invention relates to the field of mobile terminals. More particularly, the present invention relates to a method for controlling the extraction of memory cards from mobile terminals and anti-theft mobile terminals implementing such a method.

BACKGROUND OF THE INVENTION

Mobile terminals such as smartphones generally receive small memory cards such as subscriber identification module (SIM) cards (for securely storing the international mobile subscriber identity (IMSI) number and its related key, to identify and authenticate a subscriber on mobile networks), or Secure Digital (SD) cards (for external storage of data).

These memory cards are either directly inserted into a slot of the mobile terminal, or placed into a dedicated tray within the mobile terminal.

In both cases, the memory card can be easily mechanically pulled out (by grasping its extremity with the nails, by pushing it so as to trigger a spring, or by inserting a thin stick into a specific hole, etc.).

This can become a problem if the terminal is lost or stolen. Indeed, even if most of mobile phones have a screen lock set by the user preventing third party to use them, the ability to locate and get contact with the lost or stolen terminal (for instance to erase the data or even to make the terminal unusable) can be disabled by a thief, simply by turning off the mobile phone, or extracting the SIM card in order to cut off the connection to network. What's worse, the thief can eliminate the original lock by reinstalling the terminal system through a computer.

The thief may also easily pull any other memory card out from the terminal and get the user's personal information or data.

There is consequently a need for a solution to prevent pulling a SIM or another memory card out from the terminal without the consent of the user, and generally for improving the safety of mobile terminals in case of theft.

To this end, solutions have been proposed wherein a SIM card cannot be easily mechanically extracted.

In particular, document CN101330681 relates to old mobile phones wherein the SIM is located under a removable battery in the phone. In this document, when activating a "safety mode", the user ability to turn off the terminal is disabled and the battery is physically locked. Thus, a theft cannot turn off the terminal normally, or by just detaching the battery, so that the mobile phone is kept in power on state all along during the period of time before the battery is exhausted. Such a solution can allow the owner more time to locate, trace and find a stolen terminal, or at least clear up the important data in the lost phone by sending instructions to it, before it is "powered off".

However, such a solution is not adapted to recent mobile terminals, such as smartphones, wherein the battery is embedded and not removable. Besides, this solution presents a serious drawback, as the user has to deactivate the safety mode when he wants to turn the terminal off, so there is a risk for the user to forget turning on this safety mode back later.

There is consequently a need for an improved anti-theft solution for mobile terminals, more adapted to recent mobile terminals.

SUMMARY OF THE INVENTION

For these purposes, the present invention provides a mobile terminal adapted to receive a memory card, comprising a processing unit, an input interface and card locking means for locking the memory card into the mobile terminal, the card locking means being controlled by the processing unit, wherein:

the card locking means is configured to be locked when the mobile terminal is switched on; and the processing unit is configured to command unlocking of the card locking means after detecting that a predetermined authentication procedure is performed by a user at the input interface.

As it will be shown, such use of the card locking means does not require a cumbersome safety mode, while offering the best level of anti-theft protection.

Preferred but non limiting features of the present invention are as follow:

- the mobile terminal further comprises a screen and wherein the processing unit is further configured to lock the screen until a screen unlocking authentication procedure is performed by the user, the predetermined authentication procedure corresponding to the screen unlocking authentication procedure;
- the processing unit is configured to command unlocking of the card locking means of the memory card only upon request by the user at the lock screen;
- the card locking means is further configured to be unlocked when the mobile terminal is switched off and wherein the processing unit is further configured to prevent switching off the mobile terminal when the screen is locked;
- the card locking means is configured to be locked when the mobile terminal is switched off;
- the predetermined authentication procedure comprises at least one of:
  - an input of a predetermined code on the input interface;
  - if the input interface comprises a touch-sensitive screen, a predetermined touch gesture on the touch-sensitive screen;
  - if the input interface comprises a fingerprint scanner, the input of a predetermined fingerprint on the fingerprint scanner;
  - if the input interface comprises a camera, the presentation in front of the camera of a predetermined face.
- the memory card is either a SIM card or a SD card.

In a second aspect, the invention provides a method for controlling the extraction of a memory card from a mobile terminal, the mobile terminal comprising card locking means for locking the memory card into the mobile terminal, the card locking means being controlled by a processing unit of the terminal, the method comprising:

detecting at an input interface of the mobile terminal, a predetermined authentication procedure performed by a user;

if the performed authentication procedure is correct, commanding, by the processing unit, the unlocking of the card locking means.

Preferred but non limiting features of the present invention are as follow:

the method comprises requesting the predetermined authentication procedure when the user instructs unlocking the card locking means.

According to a third and a fourth aspects, the invention provides a computer program product, comprising code instructions for executing a method according to the second aspect for controlling the extraction of a memory card out from a mobile terminal; and a computer-readable medium, on which is stored a computer program product comprising code instructions for executing a method according to the second aspect for controlling the extraction of a memory card out from a mobile terminal.

BRIEF DESCRIPTION OF THE DRAWINGS

The above and other objects, features and advantages of this invention will be apparent in the following detailed description of an illustrative embodiment thereof, which is to be read in connection with the accompanying drawings wherein.

DETAILED DESCRIPTION PREFERRED EMBODIMENTS

Architecture

Figure 1:
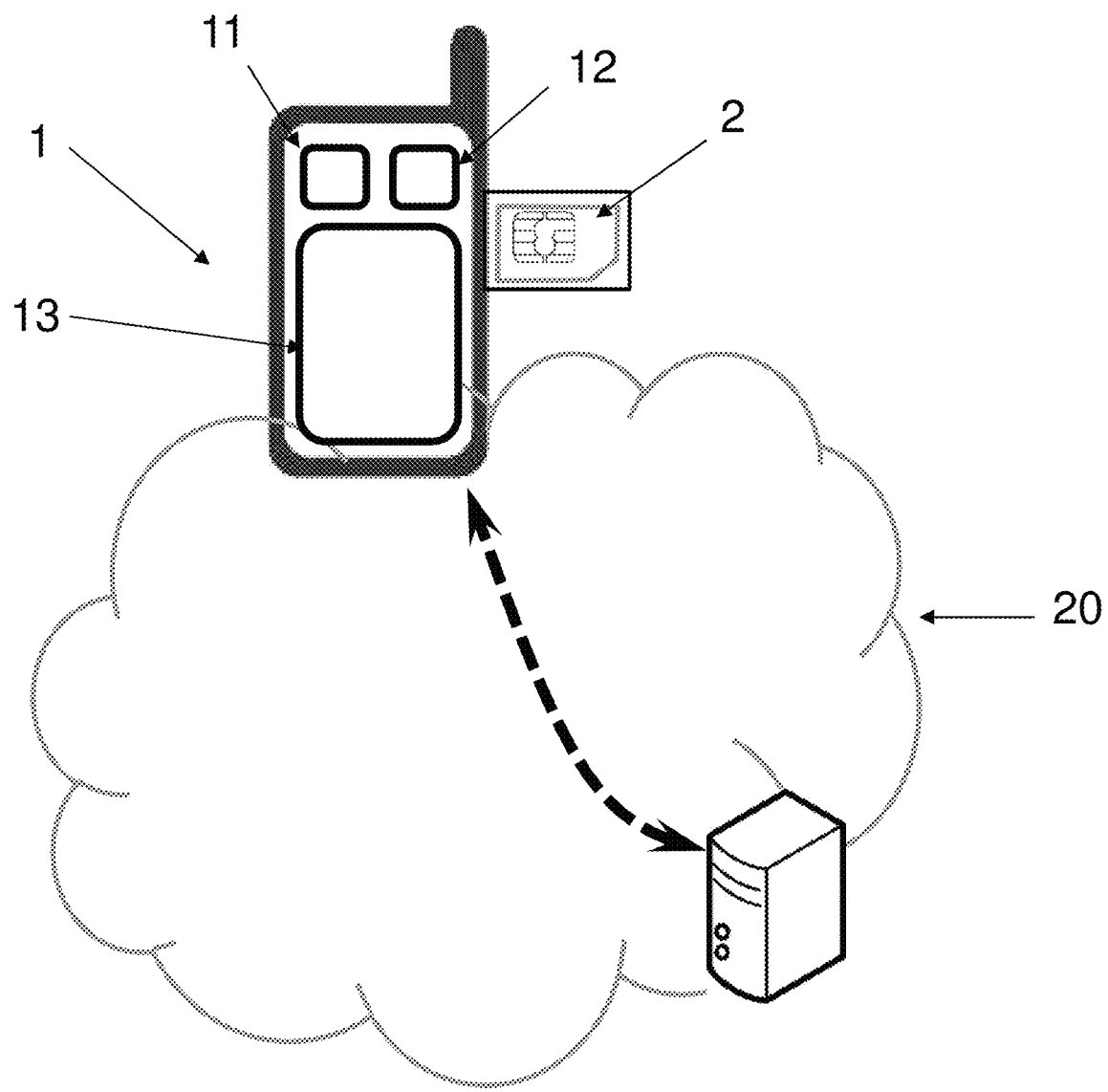
FIG. 1 illustrates an example of architecture of a mobile terminal according to the invention.

The present invention relates to a mobile terminal 1 adapted to receive a memory card 2 as represented by FIG. 1.

The mobile terminal 1 is a device comprising a processing unit 11, i.e. a CPU (one or more processors), a memory 12 (for example flash memory), and an input interface 13 which generally comprises a screen (preferably touch-sensitive) and possibly, a fingerprint scanner, a camera, etc. The memory 12 is in particular for storing applications, which can be of various types, and data. The mobile terminal 1 also typically comprises a battery, in particular a rechargeable battery (for instance lithium polymer), for powering the processing unit 11 and other units.

The mobile terminal 1 may further comprise other units such as a location unit for providing location data representative of the position of the mobile terminal 1 (using for example GPS, network triangulation, etc.), a communication unit for connecting (in particular wirelessly) the mobile terminal 1 to a network 20 (for example WiFi, Bluetooth, and preferably a mobile network, in particular a GSM/UMTS/LTE network, see below), etc.

Indeed, the mobile terminal 1 is typically a smartphone, a tablet computer, a laptop, etc. In the following description the example of a smartphone will be used.

Memory Card

The memory card 2 could be any card for storing digital information in a non-volatile way. In a preferred embodiment, the memory card 2 is a SIM (Subscribed Identification Module) storing connection data of the user, but it can be any removable storage unit such as a SD card, MMC card, etc., of any format (normal, mini, micro, etc.).

The memory card 2 is generally received by being inserted into a slot or a tray of the mobile terminal 1, as represented by FIG. 1. When inserted, the memory card 2 contacts a circuitry of the mobile terminal 1 so as to be connected to the processing unit 11.

In other words, the mobile terminal 1 is "adapted to receive" the memory card 2, meaning that it comprises a suitable slot or tray for receiving this memory card, as well as circuitry for connecting with this memory card when it is inserted.

The mobile terminal 1 may receive a plurality of memory cards 2, for instance a SIM card and a SD card.

The terminal 1 further comprises card locking means for locking the memory card 2 inside the mobile terminal 1. If the terminal 1 is adapted to receive several memory cards 2, it can comprise card locking means for each of them.

As already explained, it is to be understand that the memory card 2 is locked when received by the terminal 1, i.e. a third party cannot simply mechanically pull the memory card 2 out. In other words, the terminal is configured so that the memory card 2 can be extracted from the terminal 1 only if the card locking means are ordered to allow it.

The card locking means are controlled by the processing unit 11, in particular by implementing a driver, possibly via a dedicated application or the operating system.

When receiving specific instruction from the processing unit 11, the card locking means switches from a "locked state" to an "unlocked state".

The "locked state" is a state wherein the memory card 2 is not accessible to the user and thus not physically extractable (without damaging the mobile terminal 1). In such a state, when card extraction means is provided in the mobile terminal 1, the operation of such card extraction means (for instance activable by inserting a thin stick into a specific hole on the side of the mobile terminal) is prevented by the card locking means, so that it is not possible to pull the memory card 2 out, even when the user tries to manually extract the memory card 2. In another case where there is no card extraction means provided, the card locking means are arranged in such a state to prevent the user accessing the memory card 2.

The "unlocked state" is a state wherein the memory card 2 may be extracted by the user from the mobile terminal 1. This extraction may be done manually (for instance through usual card extraction means where a thin stick is inserted into a specific hole on the side of the mobile terminal). In such a unlocked state, when card extraction means is provided in the mobile terminal 1, the card locking means does not prevent such card extraction means to pull the memory card 2 out of the mobile terminal 1 when the user requests it manually. Alternatively, or in another case where there is no card extraction means provided, the card locking means are arranged to allow the user accessing the memory card, for instance by causing the protrusion of the memory card 2 out of the mobile terminal 1, when in such a state.

It can also be provided that the insertion of the memory card 2 into the mobile terminal 1 triggers the switching of the card locking means into the locked state (i.e. the memory card 2 can be read only in the locked state).

Lots of structures of card locking means are known to the skilled person, and for instance, the memory card 2 may be placed in a tray and the card locking means may consist in an actuated arm displacing the tray. When the arm brings the tray within the terminal 1 the state is "locked" (the only way to extract the card would be to break the arm, which is not possible from the outside of the terminal), and when the arms extends the tray is protruding and the state is "unlocked" (the card may be taken out the tray or placed within).

The card locking means is configured to be locked at least when the mobile terminal 1 is switched on, in order to prevent an easy extraction of the memory card by a thief when the mobile terminal is stolen while switched on.

In a first embodiment, the card locking means is further configured to be unlocked when the mobile terminal 1 is switched off, in order to allow the above-mentioned anti-theft protection for a mobile terminal stolen or lost when turned on, while still allowing a relatively easy card removal extraction for the user otherwise.

In another embodiment, the card locking means is further configured to be locked when the mobile terminal 1 is switched off, i.e. the card locking means is configured to keep locking the memory card 2 even if the mobile terminal 1 is switched off. In other words, the card locking means may be unlocked only when receiving unlocking instructions from the processing unit 11.

Indeed, battery locking means as described in the prior art works only when the power is on. More precisely, when the power is off, the battery locking means gets "loose" and the card behind the battery may still be somehow extracted, provided that the thief waits for the battery to get fully discharged.

To the contrary, in the present terminal 1, even when the battery is fully discharged, the memory card 2 still cannot be extracted.

To this end, the card locking means can be chosen among technologies requiring energy for passing from the "locked" state to the "unlocked" state. For instance, the card locking means may comprise an actuator of the type leadscrew or pneumatic cylinder, displacing a tray. When the energy is down, such actuator does not get loose and cannot be manually moved so the tray (and the card) stays out of reach.

Such functioning, while maybe less user-friendly at first sight, brings the best anti-theft protection.

Unlocking

The processing unit 11 of the present terminal 1 is configured to command, upon request by the user, unlocking of the card locking means of the memory card 2 after detecting that the user performs, at the input interface 13, a predetermined authentication procedure.

In other words, when compared to the above cited prior art, there is no "safety mode" to be activated for locking the card locking means of the card 2 and preventing the terminal from being switched off, but the permanent need for an authentication from the user in order to unlock the card locking means.

In a first embodiment, wherein the card locking means is further configured to be unlocked when the mobile terminal 1 is switched off (in other words, when the card locking means is not configured to keep the memory card 2 locked when the mobile terminal is turned off), the processing unit 11 is advantageously further configured to prevent switching off the mobile terminal when the mobile terminal screen is locked.

That way, a thief stealing a mobile terminal in a screen locked state can neither unlock the card locking means, nor switch off the mobile terminal. This gives the mobile terminal owner more time to locate, trace and find a stolen terminal, or clear up remotely the important data in the stolen mobile terminal, by sending instructions to this mobile terminal before its battery is depleted, without the risk of forgetting to turn on some safety mode, as the screen lock is constantly effective.

Preferably, the processing unit 11 is further configured to lock the screen until a screen unlocking authentication procedure is performed by the user.

Is such a case, the predetermined authentication procedure (required for unlocking the card locking means) preferably corresponds to, or preferably is the same as, the screen unlocking authentication procedure (required to for exiting the screen lock mode), meaning that only one authentication procedure is needed, whether the user wishes to unlock the screen, unlock the card locking means, or switch the terminal off. There is no additional specific code or procedure to be memorized by the user, and the safety is increased without altering the user-friendliness of the interface.

In another embodiment, the card locking means is further configured to be locked even when the mobile terminal 1 is switched off. In such a case, the processing unit 11 of the present terminal 1 is configured to command, upon request by the user, unlocking of the card locking means of the memory card 2 after detecting that the user performs, at the input interface 13, a predetermined authentication procedure.

Here, a user has no choice but to perform the predetermined authentication procedure for unlocking the card locking means. In other words, from the user's perspective, the only way to unlock the card locking means is to perform a predetermined authentication procedure at the input interface 13.

For that purpose, it can be provided that the card locking means can be unlocked only after detecting that the predetermined authentication procedure is performed. Alternatively, beside this predetermined authentication procedure, it can be provided that a trusted entity (such as the mobile operator to which the user has subscribed) can also unlock the card locking means, in order to cope with situations where the mobile terminal owner has forgotten how to perform the predetermined authentication procedure.

Thus, while a thief may be able here to switch off the mobile terminal 1, the thief will be never able to extract the memory card 2 without damaging the mobile terminal, regardless of its battery level, even if the mobile terminal is stolen while not in a locked screen mode.

This completely new approach takes into account two facts:
 switching on or off a terminal is performed on a daily basis, but it is very rare to pull a memory card out;
 a terminal with a SIM locked within (i.e. without the possibility to insert a new one) has no value.

Indeed, if the card locking means can be unlocked after that the mobile terminal battery is depleted and if, by that time, the stolen terminal has not been recovered by its owner, the thief can ultimately extract the memory card, i.e. can access the owner's personal data and can sell the phone.

To the contrary, by having the card locking means of the memory card 2 permanently locked and unlockable only if the user performs a predetermined authentication procedure at an input interface 13, even though a thief can immediately switch the terminal 1 off for not being located, this is not any longer a problem as the memory card 2 can only be extracted when the terminal 1 is powered on (because it requests command from the processing unit 11).

In that case:
- either the thief keeps the terminal switched off, and thus cannot even try to pull the memory card out, so the terminal is unusable (the only possibility is to attempt physically damage the terminal for breaking the card locking means, which at the best will steeply decrease the price of the terminal); or
- the thief switches on again the terminal 1, in order to try controlling the card locking means, but by doing so, the mobile terminal 1 resumes its connection to network and can be located again. The longer the thief tries to unlock the card locking means (for instance by inputting random codes, on by trying to hack it), the higher the probability of the thief being caught.

Consequently, the thief will most likely get rid of the mobile terminal 1, and its owner might recover it. And anyway, the user's data remains out of reach for the thief.

Authentication Procedure

In a known fashion, the predetermined authentication procedure advantageously comprises one or more of the following:
- an input of a predetermined code on the input interface 13;
- if the input interface 13 comprises a touch-sensitive screen, the performance of a predetermined touch gesture on the touch-sensitive screen;
- if the input interface 13 comprises a fingerprint scanner, the input of a predetermined fingerprint on the fingerprint scanner;
- if the input interface 13 comprises a camera, the presentation in front of the camera of a predetermined face.

If the processing unit 11 implements a lock screen on the interface 13, as explained beforehand, this predetermined authentication procedure may correspond to, or is advantageously the same as, the authentication procedure for passing through the lock screen (i.e. for exiting the screen lock mode).

In a first embodiment, a specific button may be provided within system preferences of the mobile terminal software interface, for requesting unlocking the card locking means of the memory card 2.

When the user selects this button using the input interface 13 (for instance by tapping it if the input interface 13 comprises a touch-sensitive screen), the processing unit 11 receives instructions for unlocking the card locking means, and in response requests the user to perform, at the input interface 13, the predetermined authentication procedure.

For instance, a dialog box may read "please identify using your code or your fingerprint". If the procedure is correct, the processing unit 11 commands the unlocking of the card locking means of the memory card 2.

In that case, when in a screen lock mode, the user has to perform a first authentication procedure for passing through the lock screen, then a second authentication procedure (possibly the same) for commanding the unlocking of the card locking means, once out of the screen lock mode. Therefore, even if the mobile terminal 1 is stolen while the lock screen is already passed through (i.e. the first authentication procedure is already performed), the second authentication procedure is still required.

In a second embodiment where the requirement to exit first the screen lock mode is avoided, the processing unit 11 may be configured to command unlocking of the card locking means of the memory card 2 upon request by the user at the lock screen. For that purpose, the screen lock may comprise a button for requesting unlocking the card locking means of the memory card 2. If the user activates this button, a dialog box as above can be displayed in order to request the user to perform the predetermined authentication procedure.

Alternatively, when in a screen lock mode, the predetermined authentication procedure for unlocking the card locking means of the memory card 2 may correspond to, or preferably be the same as, the screen unlocking authentication procedure for passing through the lock screen (i.e. exiting the screen lock mode).

In another embodiment, the screen lock may comprise another specific button for requesting switching off the mobile terminal 1, such an action being subject to performing a dedicated authentication procedure which can correspond to, or even be the same as, the predetermined authentication procedure.

In that case, when not in the screen lock mode, the user has to go back to the lock screen for pulling the memory card 2 out (or for switching the mobile terminal 1 off). Consequently, even if the mobile terminal 1 is stolen while the lock screen is already passed through (i.e. when the screen unlocking procedure is already performed), locking the screen and performing again the authentication procedure is required to be able to extract the memory card.

It to be noted that both embodiments can be combined, so that the user may practically request unlocking the card locking means of the memory card 2 with a single authentication procedure required, no matter if the lock screen is passed through or not.

Method, Computer Product Program, and Computer-Readable Medium

The present invention also concerns a method for controlling the extraction of a memory card 2 from a terminal mobile 1 as previously defined (i.e. which comprises card locking means for locking the memory card 2 controlled by a processing unit 11 of the terminal 1).

Figure 2:
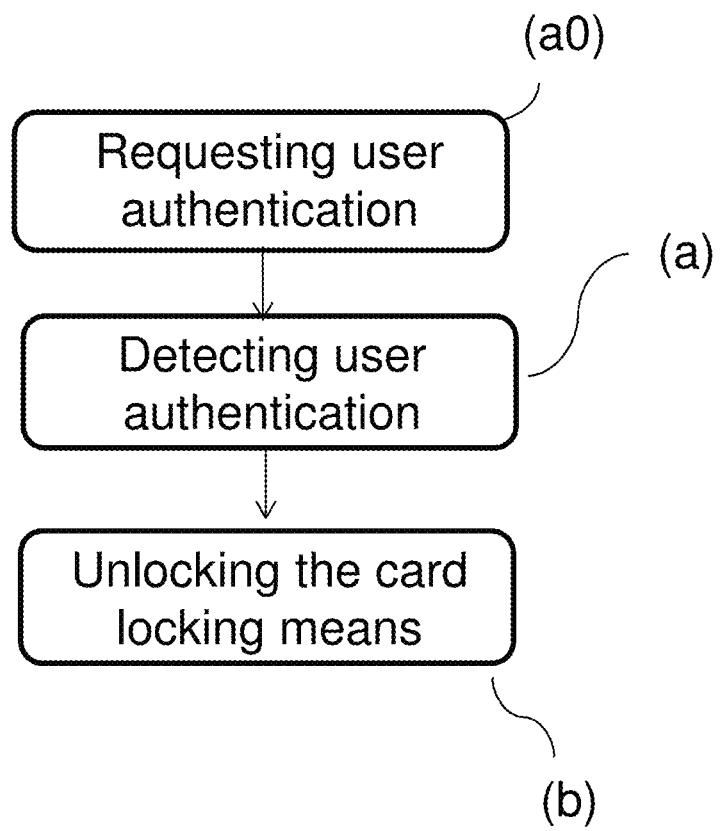
FIG. 2 illustrates an embodiment of a method of controlling the extraction of a memory card from such a mobile terminal.

This method is illustrated by FIG. 2 and comprises, as explained:
- possibly requesting (step a0), by the processing unit 11 (for instance through a dialog box), a predetermined authentication procedure when the user instructs unlocking the card locking means (in particular when pressing a button, either in the system preferences of a software interface or at the lock screen);
- detecting (step a), at an input interface 13 of the terminal 1, a predetermined authentication procedure performed by a user;
- if the performed authentication procedure is correct, commanding (step b) by the processing unit 11 the unlocking of the card locking means.

The invention further proposes a computer program product, comprising code instructions for executing (in particular with a processing unit 11 of the mobile terminal 1) the previously described method, as well as a computer-readable medium (in particular a memory 12 of the terminal 1), on which is stored a computer program product comprising code instructions for executing this method. In particular, this computer program product may correspond to the possibly dedicated software application discussed previously and/the operating system installed on the mobile terminal.

The invention claimed is:

1. A mobile terminal adapted to receive a memory card, the mobile terminal comprising:
   a processing unit;
   a screen;
   an input interface; and a hardware card locking actuator configured to lock the memory card into the mobile terminal, wherein,
the hardware card locking actuator is controlled by the processing unit,
and is configured to be locked when the mobile terminal is switched on; and
the processing unit is configured to lock the screen until a screen unlocking authentication procedure is performed by a user at the input interface and is configured to command unlocking of the hardware card locking actuator after the processing unit has detected that the screen unlocking authentication procedure has been performed by the user at the input interface,
wherein the screen unlocking authentication procedure comprises an input of a predetermined code on the input interface,
wherein, when locked by the hardware card locking actuator, the memory card cannot be removed from the mobile terminal without damaging the mobile terminal.

2. The mobile terminal according to claim 1, wherein the processing unit is further configured to command unlocking of the hardware card locking actuator of the memory card only upon request by the user at a lock screen on the input interface.

3. The mobile terminal according to claim 2, wherein the hardware card locking actuator is further configured to be unlocked when the mobile terminal is switched off and wherein the processing unit is further configured to prevent switching off the mobile terminal when the screen is locked.

4. The mobile terminal according to claim 1, wherein the hardware card locking actuator is further configured to be locked when the mobile terminal is switched off.

5. The mobile terminal according to claim 1, wherein the memory card is a SIM card.

6. A method for controlling the extraction of a memory card from a mobile terminal, the mobile terminal comprising a screen and a hardware card locking actuator configured to lock the memory card into the mobile terminal, the hardware card locking actuator is controlled by a processing unit of the terminal, the method is performed when the screen of the mobile terminal is locked and comprises:
detecting at an input interface of the mobile terminal, a screen unlocking authentication procedure performed by a user; and
commanding by the processing unit, the unlocking of the hardware card locking actuator when the screen unlocking authentication procedure is performed correctly,
wherein the screen unlocking authentication procedure comprises an input of a predetermined code on the input interface,
wherein, when locked by the hardware card locking actuator, the memory card cannot be removed from the mobile terminal without damaging the mobile terminal.

7. The method according to claim 6, comprising requesting the screen unlocking authentication procedure when the user instructs unlocking the hardware card locking actuator.

8. A non-transitory computer-readable storage medium, storing instructions which, when executed by a processor, cause the processor to control the extraction of a memory card from a mobile terminal, the mobile terminal comprising a screen and a hardware card locking actuator configured to lock the memory card into the mobile terminal, the hardware card locking actuator being controlled by the processor, and being performed when the screen of the mobile terminal is locked, wherein the processor is configured to perform:
detecting at an input interface of the mobile terminal, a screen unlocking authentication procedure performed by a user; and
commanding by the processor, the unlocking of the hardware card locking actuator when the screen unlocking authentication procedure is performed correctly,
wherein the screen unlocking authentication procedure comprises an input of a predetermined code on the input interface,
wherein, when locked by the hardware card locking actuator, the memory card cannot be removed from the mobile terminal without damaging the mobile terminal.

9. The mobile terminal according to claim 1, wherein the screen unlocking authentication procedure comprises a predetermined touch gesture on the input interface, wherein the input interface comprises a touch-sensitive screen.

10. The mobile terminal according to claim 1, wherein the screen unlocking authentication procedure comprises an input of a predetermined fingerprint on the input interface, wherein the input interface comprises a fingerprint scanner.

11. The mobile terminal according to claim 1, wherein the screen unlocking authentication procedure comprises a presentation in front of the input interface of a predetermined face, wherein the input interface comprises a camera.

12. The mobile terminal according to claim 1, wherein the memory card is an SD card.

13. A mobile terminal adapted to receive a memory card, the mobile terminal comprising:
a processing unit;
a screen;
an input interface; and
hardware card locking means for locking the memory card into the mobile terminal, wherein
the hardware card locking means is controlled by the processing unit and is configured to be locked when the mobile terminal is switched on; and
the processing unit is configured to lock the screen until a screen unlocking authentication procedure is performed by a user at the input interface and is configured to command unlocking of the hardware card locking means after the processing unit has detected that the screen unlocking authentication procedure has been performed by the user at the input interface,
wherein the screen unlocking authentication procedure comprises an input of a predetermined code on the input interface,
wherein, when locked by the hardware card locking means, the memory card cannot be removed from the mobile terminal without damaging the mobile terminal.

14. The mobile terminal according to claim 1, wherein the hardware card locking actuator comprises a lead screw or pneumatic cylinder configured to displace a tray for the memory card.

15. The method according to claim 6, wherein the hardware card locking actuator comprises a lead screw or pneumatic cylinder configured to displace a tray for the memory card.

16. The mobile terminal according to claim 13, wherein the hardware card locking means comprises a lead screw or pneumatic cylinder configured to displace a tray for the memory card.

* * * * *